US 8,229,715 B1

(12) United States Patent
Teller et al.

(10) Patent No.: US 8,229,715 B1
(45) Date of Patent: Jul. 24, 2012

(54) SYSTEM AND METHODS FACILITATING COLLABORATION IN THE DESIGN, ANALYSIS, AND IMPLEMENTATION OF A STRUCTURE

(75) Inventors: Eric Teller, San Francisco, CA (US); Nicholas Chim, San Francisco, CA (US); Augusto Roman, Mountain View, CA (US); Jennifer Carlile, San Francisco, CA (US); Alena Fong, Fremont, CA (US); Eli Attia, Palo Alto, CA (US); Michelle Kaufmann, Novato, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/163,307

(22) Filed: Jun. 17, 2011

(51) Int. Cl.
*G06F 17/50* (2006.01)
*G09B 25/00* (2006.01)

(52) U.S. Cl. .............................. 703/1; 434/72

(58) Field of Classification Search ........ 703/1; 434/72, 434/79
See application file for complete search history.

(56) References Cited

U.S. PATENT DOCUMENTS

| 5,535,320 | A | 7/1996 | Gay et al. | |
|---|---|---|---|---|
| 6,859,768 | B1 | 2/2005 | Wakelam et al. | |
| 2006/0075718 | A1* | 4/2006 | Borne et al. | 52/745.02 |
| 2009/0234696 | A1 | 9/2009 | Attia | |
| 2010/0070241 | A1 | 3/2010 | Opdahl et al. | |
| 2010/0257457 | A1* | 10/2010 | De Goes | 715/751 |
| 2011/0010134 | A1* | 1/2011 | Balla et al. | 703/1 |
| 2011/0047484 | A1* | 2/2011 | Mount et al. | 715/753 |
| 2011/0054652 | A1 | 3/2011 | Heil | |
| 2011/0191069 | A1 | 8/2011 | Madsen et al. | |

OTHER PUBLICATIONS

Chen, Po-Han et al. "Implementation of IFC-Based Web Server for Collaborative Building Design Between Architects and Structural Engineers", Aug. 27, 2004, Elsevier B.V.*
Setareh, Mehdi et al., "Development of a Collaborative Design Tool for Structural Analysis in an Immersive Virtual Environment", Feb. 14, 2001, Virginia Polytechnic Institute and State University.*
Luo, Yuhua, "Cooperative Design in Building Construction", May 10, 2007, Department of Mathematics and Computer Science, University of Balearic Islands, Spain.*
Scheer, Sergio et al., "Building Design Teamwork Supported by a Collaborative CAD Modeling Process Analysis", May 30, 2010, Nottingham Univesity Press.*
Anderson, Lee, et al. "A Virtual Environment for Conceptual Design in Architecture", International Immersive Projection Technologies Workshop, Eurographics Workshop on Virtual Environments (2003).
Larson, K., chapter titled "Open Source Living", Building (in) The Future: Recasting Labor in Architecture, ed. Deamer and Bernstein, pp. 100-113 (Yale School of Arch., 2010).

* cited by examiner

*Primary Examiner* — Kandasamy Thangavelu
*Assistant Examiner* — Cedric D Johnson
(74) *Attorney, Agent, or Firm* — Jonathan A. Small

(57) ABSTRACT

A computer-implemented system for coordinating the design and implementation of a structure is disclosed. The system includes a design workspace, a design engine which receives various inputs and produces a structure design for display in the design workspace, first and second interfaces permitting first and second users, respectively, to view and manipulate a design, either independently or concurrently, and a library of design elements and editing tools accessible to the first and second users. One or more users may be provided with controls limiting the manipulations that other user(s) may make to the design. Change tracking and error and conflict checking are provided to assist with merging design manipulations originating from separate users.

2 Claims, 8 Drawing Sheets

SYSTEM AND METHODS FACILITATING COLLABORATION IN THE DESIGN, ANALYSIS, AND IMPLEMENTATION OF A STRUCTURE

CROSS-REFERENCE TO RELATED APPLICATIONS

The present disclosure is related to and claims priority from copending U.S. patent application titled "System and Methods for Structure Design, Analysis, and Implementation", Ser. No. 13/112,727, filed on May 20, 2011, which is incorporated herein by reference. The present disclosure is also related to U.S. patent application titled "Quantification of Structure Fitness Enabling Evaluation and Comparison of Structure Designs", Ser. No. 13/163,424, which is incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

The present disclosure is related to the design and realization of structures such as buildings, and more specifically to systems and methods for facilitating collaboration in the designing, iterating, and building of such structures, and supporting the ecosystem of the processes and the parties participating in those operations.

Traditionally, the process of designing and building a structure involves many professionals with many different skill sets. As an example, a developer interested in having a commercial structure built may retain an architect, who takes the developer's requirements and preferences, details about the site, building codes and the like, and first generates a conceptual design, then a more detailed schematic design. At this stage, the architect's role is to synthesize, problem solve, and design. The resulting forms, as drawn and/or modeled, are typically a blending of art and engineering. Reviews and reworking for multiple different audiences typically occur next in what is often referred to as design development. For example, an architectural engineer or similar professional may review the design and plans for the proposed structure's integrity and safety, the developer may have input for modifications to the design to meet a desired design goal, the builder may introduce limitations based on cost, time-to-completion, feasibility, and so on.

Portions of the design may also be sent to sources for cost estimates and to determine availability of elements of the structure, estimates for labor cost and time-to-delivery of components, etc. Estimates from these many other sources may then also be factored into calculated time-to-completion, cost, and so on. Bidding and negotiation may take place, such as with a builder or construction manager, parts and services providers, etc. Further design development then typically takes place to bring the design in line with budgets, evolving design requirements, etc.

Once the final design and plans converge for the main parties of interest (developer, architect, engineer, and builder, who form the core of the ecosystem for the project), required permits and other approvals may then be sought. An additional one or more round(s) of design development take place including negotiations with certifying and permitting agencies in order to converge on a mutually acceptable design. Ultimately, construction begins and in spite of inevitable cost and time overruns a structure is built.

While there are many other steps and parties involved, and the actual order of things may vary from structure to structure, the process is long, convoluted, circular, often unnecessarily complex, with many parties involved, and there are many opportunities for inefficiencies and delays in the various design, interaction, revision, and iteration of the design and build process. Furthermore, for each new structure, the process essentially reinvents itself from scratch, but never the same from one structure to the next. There is little re-use of designs, processes, and data in the design and construction of new structures. And, there are few resources available to improve efficiency and effectiveness in the communication and work processes taking place in the community of people and agencies involved in the design and construction process.

SUMMARY

Accordingly, the present disclosure is directed to systems and methods for more efficiently facilitating collaboration in the design, analysis, and implementation of a structure than heretofore possible. The systems and methods disclosed permit two or more parties to collaboratively create, edit, share, and comment on elements of a design or a design as a whole.

According to aspects of the disclosure, interfaces to the system are provided to permit two or more parties to simultaneously view and manipulate a structure design. Viewing and manipulation may be in unique interfaces (such as windows) for each user, and the work of each user proceeds independently until that work is merged back into a master design. Viewing and manipulation may also or alternatively be in a common interface, with manipulations by each user viewable essentially as they are made.

The interfaces are communicatively coupled to a design engine, which facilitates design development based on various inputs such as site data, a program (e.g., function) which a design is intended to serve, user inputs, etc., and which manages or mediates conflict checking, checking for required approvals and authority levels, tracking changes, rendering the design in a design workspace (e.g., a common workspace, a specific workspace for each user, and so on), etc, as well as the user manipulations.

According to one aspect of the disclosure, different users of the system may have different levels of authority, which provide limits on their ability to manipulate a design in certain ways. The authority may be based on an individual's or association's role within a project, certification of individual users or associations of users, etc. Manipulation of certain portions of a design may be approval-based, with one or more individuals having responsibility for the design approving or rejecting proposed design changes.

According to another aspect of the disclosure, systems and methods facilitate a close working relationship between those defining the design of a structure and vendors of systems and components, who provide data relating to elements that may be incorporated into the design, such as material properties, cost, availability and so on. Similarly, service providers provide data relating to cost, timing, etc. of services they provide such that that data may be utilized by the design team and factored into attributes of the design.

Accordingly, a computer-implemented system and method for facilitating collaborative structure design efforts, and for coordinating implementation of a resulting design, is provided which comprises providing: a design workspace in which a structure design can be rendered during a design process; a design engine which receives various inputs, and produces a structure design for display in the design workspace; a first interface, coupled to the design engine, permitting a first user to view and manipulate aspects of the design rendered in the design workspace; a second interface, coupled to the design engine, permitting the second user to view and manipulate aspects of the design rendered in the design workspace; and a library of design elements and editing tools, coupled to the first and second interfaces and the design engine such that the first user, the second user or both the first and second users may select an element therefrom and place that element in the design, or otherwise edit said design, for rendering by the design engine in the design workspace.

According to a still further aspect of the disclosure, a computer-implemented system and method for facilitating collaborative analysis of a structure design comprises: providing a design engine for receiving various inputs and producing a structure design therefrom, the structure design represented by design data; an interface configured for formatting the data for provision to a secondary analysis system, whereby the secondary analysis system can receive the data from the interface in a format required by the secondary analysis system; and the interface further configured for receiving analysis data from the secondary analysis system for processing by the design engine.

The above is a summary of a number of the unique aspects, features, and advantages of the present disclosure. However, this summary is not exhaustive. Thus, these and other aspects, features, and advantages of the present disclosure will become more apparent from the following detailed description and the appended drawings, when considered in light of the claims provided herein.

BRIEF DESCRIPTION OF THE DRAWINGS

In the drawings appended hereto like reference numerals denote like elements between the various drawings. While illustrative, the drawings are not drawn to scale. In the drawings.

DETAILED DESCRIPTION

We initially point out that description of well-known processes, components, equipment, and other well-known details are merely summarized or are omitted so as not to unnecessarily obscure the details of the present invention. Thus, where details are otherwise well known, we leave it to the application of the present disclosure and the knowledge and ability of one skilled in the art to suggest or dictate choices relating to those details.

Figure 1:
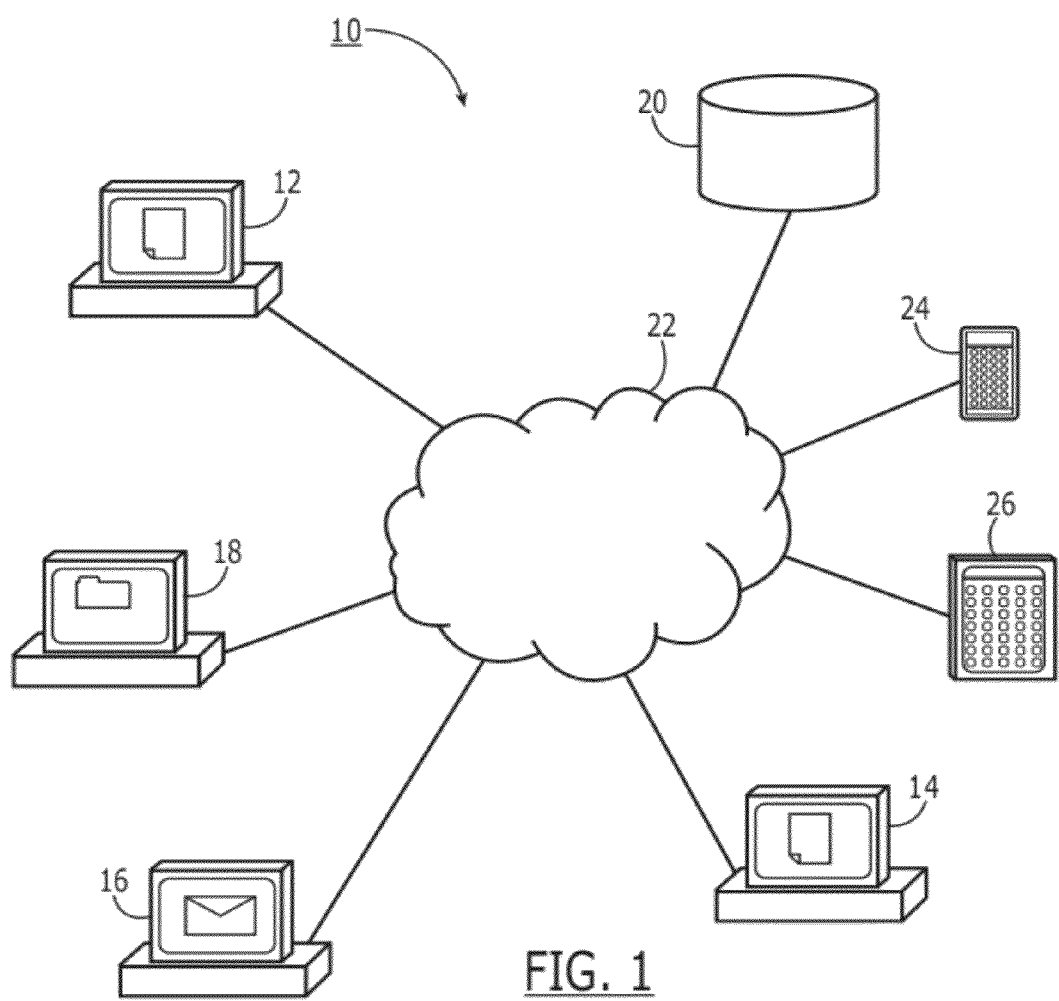
FIG. 1 is a high-level representation of a distributed network environment, comprising hardware and software, within which various embodiments of a system for structure design, analysis, and implementation according to the present disclosure may be employed.

With reference initially to FIG. 1, a distributed network environment 10 is shown, comprising hardware and software, within which various embodiments of the present disclosure may be employed. More specifically, distributed network environment 10 comprises multiple interconnected elements of hardware, each running software, allowing those elements of hardware to communicate with one another, whether by wired or wireless connection. Such elements of hardware include, but are not limited to, a first client workstation 12, a second client workstation 14, a mail server computer 16, a file server computer 18, and network appliances 20 such as remote storage, each communicating via the public Internet 22. The client workstations and servers generally may be referred to as computer devices. Other computer devices, such as mobile computationally-enabled telephone handsets (so called "smart phones") 24, tablet-style computer devices 26, and so on may also form a part of network environment 10.

Alternatives to using the public Internet, or additional interconnection mechanisms include local area networks (LANs), wide area networks (WANs), etc. Alternatives to client workstations, or additional computer mechanisms include personal computers, servers that are personal computers, minicomputers, personal digital assistants (PDAs), mainframes, etc. The network within which the various embodiments of the present disclosure operates may also comprise additional or fewer devices without affecting the scope of the present disclosure.

First and second client workstations 12, 14 may communicate via the public Internet 22 using known Web browser software or dedicated, specific-purpose application software. As is well known, software components supporting client workstations 12, 14, servers 16, 18, and network appliances 20 include or reference logic and/or data that may form a part of the software component or be embodied in or retrievable from some other hardware of software device or signal, either local or remote and coupled via a network or other data communications device.

Thus, embodiments of the invention may be implemented as methods, apparatus, or articles of manufacture as or in software, firmware, hardware, or any combination thereof. As used herein, article of manufacture (or alternatively, computer program product) is intended to encompass logic and/or data accessible from any computer-readable device, carrier, or media.

Those skilled in the art will recognize many modifications may be made to this exemplary environment without departing from the scope of the present disclosure. For example, it will be appreciated that aspects of the present disclosure are not dependent upon data structure formats, communications protocols, file types, operating systems, database management system, or peripheral device specifics. Accordingly, the following description is provided without reference to specific operating systems, protocols, or formats, with the understanding that one skilled in the art will readily be able to apply this disclosure to a system and format of choice.

The present disclosure provides a computer-implemented system and methods for collaboratively producing a design of a structure and coordinating aspects of its implementation. As used herein, a "structure" may be, but is not limited to, habitable buildings, functional structures, artistic structures, and so on, and the nature of the structure does not form a limitation on the scope of the present disclosure. In addition, as used herein, "designing" is intended to mean all aspects of preparing plans for implementing a structure, including but not limited to developing a set of documents that describe a structure and aspects of its construction, as well as estimates relating to the design and construction of the structure. Designing a structure may optionally include the materials for and processes of obtaining prerequisite certifications and approvals for constructing the designed structure. In many cases, designing a structure is a collaborative endeavor between individuals and organizations. As well, as used herein, "implementation" is intended to mean verifying aspects of a design, arranging accessibility to required parts, services, and personnel, maintaining a project timeline, maintaining a project budget, managing changes during the build phase, financing and insurance, and constructing the structure. Optionally, implementation may also include coordinating and obtaining approvals, permits, and the like.

Furthermore, as used herein, "manipulation" of (or to "manipulate") a design includes but is not limited to adding elements to a design, subtracting elements form a design, reconfiguring portions of a design, moving portions of a design, partially or fully relocating a design on a site, requesting and viewing attributes about a design, implementing automated optimization of a design, checking aspects of a design for structural soundness or against codes or regulations for such a design, comparing alternative designs, developing cost estimates, construction time, and other attributes of a structure built according to a design, and so on.

Still further, as used herein, "interface" is intended to include data structures, virtual and physical connections between devices, computer-human user interface, and other mechanisms that facilitate the exchange of data between computer systems and/or control of one or more such systems. In one embodiment, an interface requires a minimum or no user data entry or manual delivery of data from one system to another. In another embodiment, data that needs to be entered manually may be retained and reused within the system, reducing future data entry requirements.

According to the present disclosure, a user interacts with a computer system and controls provided thereby to design a structure. In the process, the system may communicate with other systems to obtain data, verify data, deliver data, store or retrieve data, etc. Those other systems may be interfaces to other computer-user interactions or be autonomous or some combination of the two. By way of a network, the systems and methods thereby facilitate collaboration between multiple individuals and/or organizations in the design, analysis, and implementation of a structure.

In general, a method of designing a structure employing a system of the type disclosed herein begins with a user specifying a program (general aspects of the structure and its intended uses), which may be translated into requirements of the design. Given certain starting conditions, such as a description of the site on which the structure is to be built, a structure footprint (or equivalently, perimeter), the basic intended use of the structure, and so forth, the system may provide a proposed initial design, and self-iterate toward meeting the design requirements. Alternatively, the user may select "cells" and/or other elements from a palette (or specially designed) and manipulate those elements in a design workspace to populate a structure design.

According to the present disclosure, a cell is a fundamental element employed by the system and user to design a structure. Cells are abstractions of portions of a structure (although in certain cases a structure may in fact be comprised of a single cell) upon which other systems in the design depend. Cells are instantiated as part of the design process. Cells include rules governing aspects of the instantiations, such as how an instance of one cell connects to another instance, size ranges of instances, systems or components included in or required by an instance, and so on. Cells are discussed in further detail below.

Figure 2:
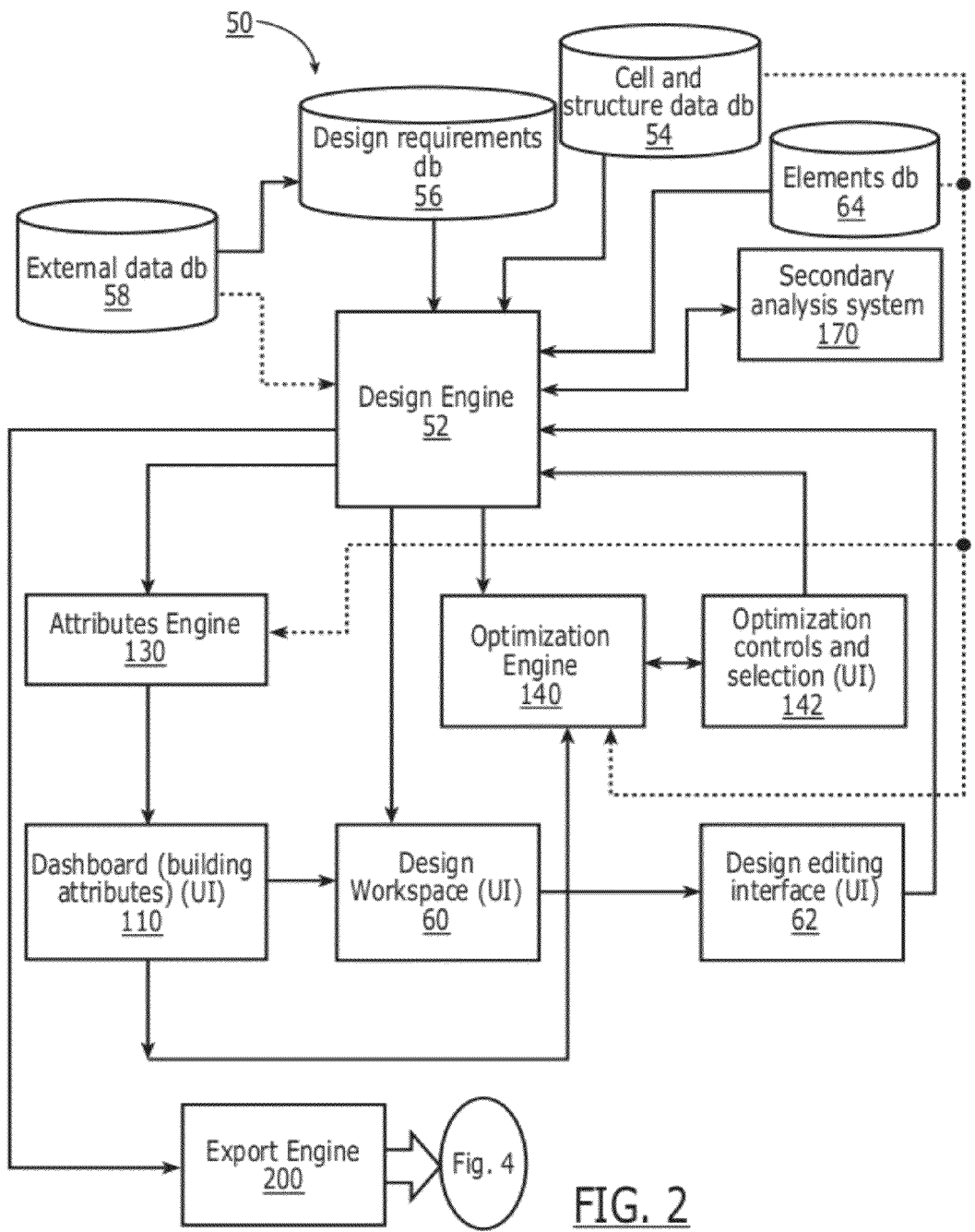
FIG. 2 is a schematic diagram of a portion of a first embodiment of a computer-implemented system for structure design, analysis, and implementation according to the present disclosure.

Referring to FIG. 2, there is shown therein a schematic diagram of a portion of a first embodiment of a computer-implemented system 50 for designing a structure and coordinating its implementation according to the present disclosure. System 50 comprises a design engine 52 that manages aspects of the structure design process. Design engine 52 may be realized in software, firmware, hardware, etc.

Design engine 52 receives various inputs including data from cell and structure data database 54, design requirements database 56, and optionally external data database 58 and elements database 64 interconnected thereto. While these data inputs are shown and discussed in terms of databases, it will be appreciated that other forms of data input, such as streaming data, real-time measurement data, calculated data, etc. may also be employed.

Design engine 52 provides an output in the form of data representing a structure that is rendered in a design workspace user interface (UI) 60. Design engine 52 may include rendering capabilities, or may rely on additional tools, such as Google SketchUp to perform rendering tasks. Design workspace UI 60 provides a user with a visual representation of the structure being designed, as well as a design-editing interface 62 at which a user may edit the design.

Figure 3:
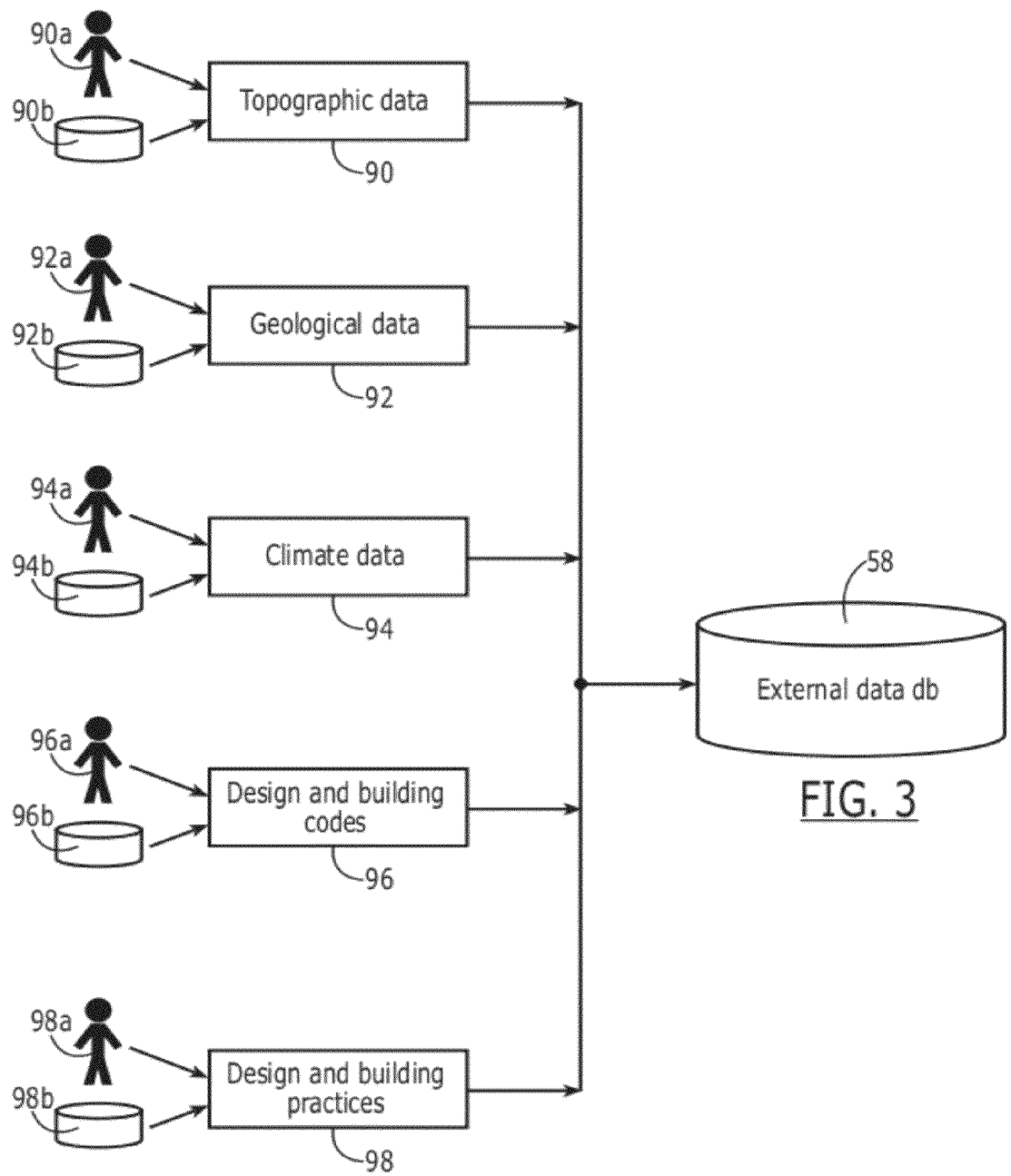
FIG. 3 is an illustration of one embodiment of an external data database configured to receive data from a number of sources external to the system for structure design and analysis according to the present disclosure.

Design requirements database 56 may also provide design engine 52 with rules driven by certain external data provided by external data database 58. FIG. 3 illustrates a number of representative sources of this external data. For example, one initial phase of design development is a topographic study of the site on which the structure is to be erected. Data 90 from this topographic study may be utilized by design requirements database 56 to provide rules for design engine 52. Similarly, geologic data 92 required to determine the nature of the soil, bedrock, water table, etc. and climate data 94 relating to averages and ranges of temperatures, rain and snow fall, wind speeds, and so on, which all factor into structure design may be utilized by design requirements database 56 to provide input to the rules for the design engine 52.

In addition to physical and environmental data, a wide variety of design and building codes 96 may suggest or require design rules be implemented by design engine 52. Similarly, generally accepted design and building practices 98 may also suggest or require design rules be implemented by design engine 52. Other external data include zoning data, historical real estate data, neighborhood information (key services, pedestrian and vehicular traffic flow), physical form of neighboring buildings, etc.

Much of the data provided by external data database 58 originates with human data collection and transmission to database 58, as illustrated by 90*a*, 92*a*, and so on. Other data may reside in repositories connected directly or indirectly to external data database 58, as illustrated by 90*b*, 92*b*, and so on. With reference again to FIG. 2, system 50 facilitates the communication of a large volume of disparate data, from a wide variety of different sources, into a centralized resource for use by design engine 52. In cases of particular interest herein, certain data originates with human data collection for use by the system. Therefore in one aspect of the present disclosure, system 50 serves as a point of connection between data providers and data consumers.

In general, the many methods of collection of the data and the many formats in which the data may be provided to design engine 52, are beyond the scope of the present disclosure. However, in one embodiment a system is used to obtain data from a number of sources, and changes in data or data integrity may be independently verified. Initially, a group of participants are requested to provide data to external data database 58. This might, for example, be the manual inputting into digital format of building codes for a municipality that does not have readily available digital versions of such codes. Additionally, there may be overlap and in fact duplication in the work of the participants. As the amount of duplication increases, indicating that input from prior participants is correct and complete, the number of participants requested to input data may be decreased. Some steady state input, with consequent duplication continues. Thereafter, if it is noted that conflicts begin to arise, such as code sections of the same code designation are no longer duplicates of previously entered data for that section, it may be concluded that either (1) errors have occurred in either the earlier or later data entry, or (2) the code section may have changed since the original data entry. In either case, the number of participants may be increased, with a commensurate increase in the data provided by the group. When duplication again rises above a threshold, the number of participants may be decreased. Again, there are many methods of data collection and entry when that data is not otherwise available is digital format for use by system 50, as will be appreciated by one skilled in the art, and the aforementioned is simply one example of such a method.

During the design phase of a project, the structure produced by design engine 52 evolves in an effort to meet the various requirements of the interested parties. This design evolution may in part be achieved relatively autonomously by design engine 52 implementing the aforementioned rules and various optimizations. Design evolution is also achieved through the interaction of various parties and organizations through direct manipulation of elements of the design provided by way of an interface such as user design editing interface 62 and inputs from various secondary data sources and analysis systems.

Figure 4:
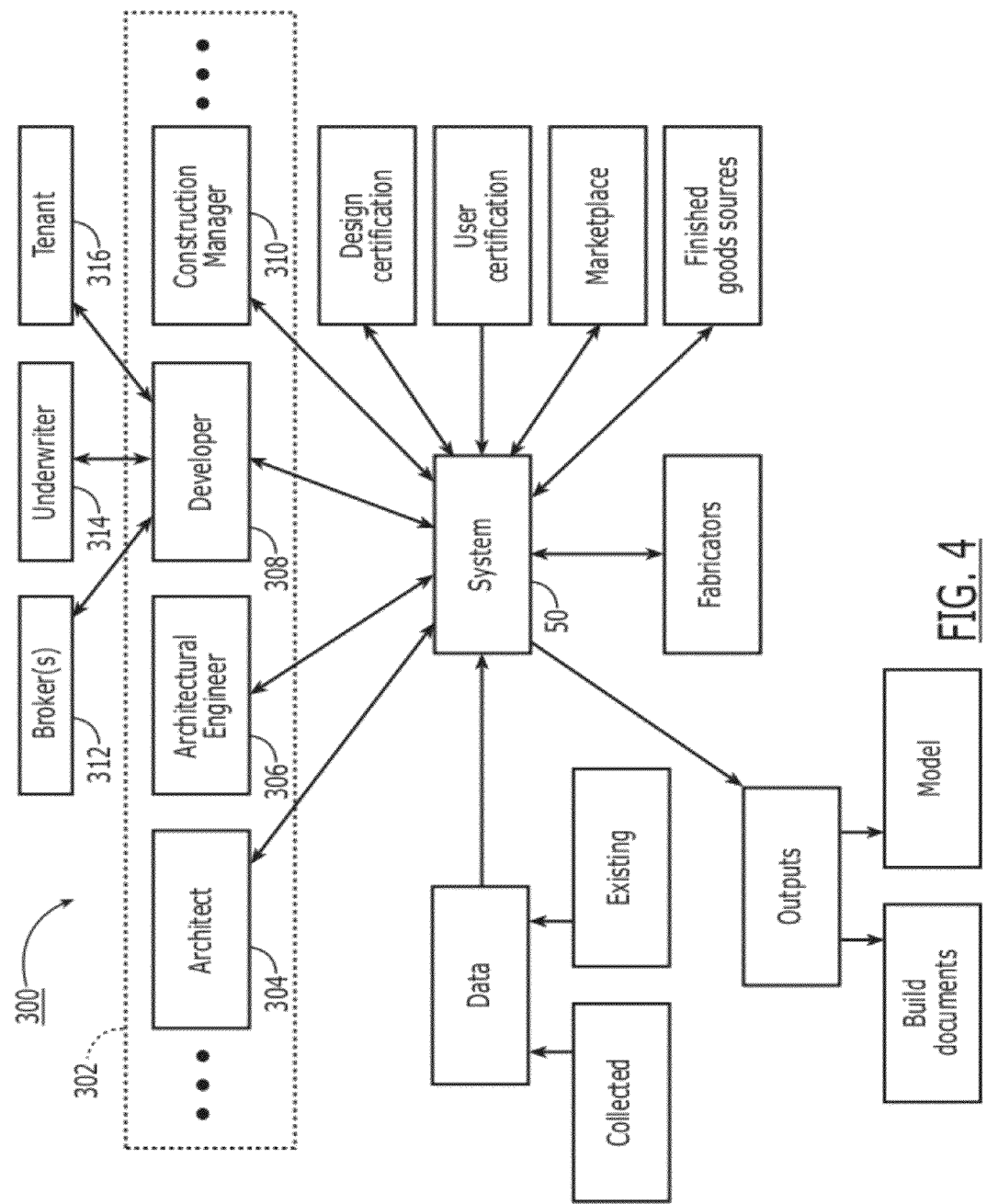
FIG. 4 is an illustration of one exemplary structure design environment including a number of the relevant participants in the design evolution, analysis, and implementation process.

FIG. 4 is an illustration of one exemplary structure design environment 300 including a number of the relevant participants in the design evolution, analysis, and implementation process, operating around system 50. Traditional design participants 302 include one or more architects 304, architectural engineers 306, developers 308, construction managers 310, and so on. Other parties that may be directly or indirectly involved in the design process include property broker 312, project underwriter 314, property tenant 316, and so on. Any two or more of such parties, and two or more individuals within organizations serving these roles, may wish to collaborate on a structure design. For example, an architectural firm may wish that a senior architect work with a junior architect to develop a design for a client. An architect may wish to deliver a design to an architectural engineer so that structural details can be resolved. A developer may wish to involve a tenant in design details, and so on.

Figure 5:
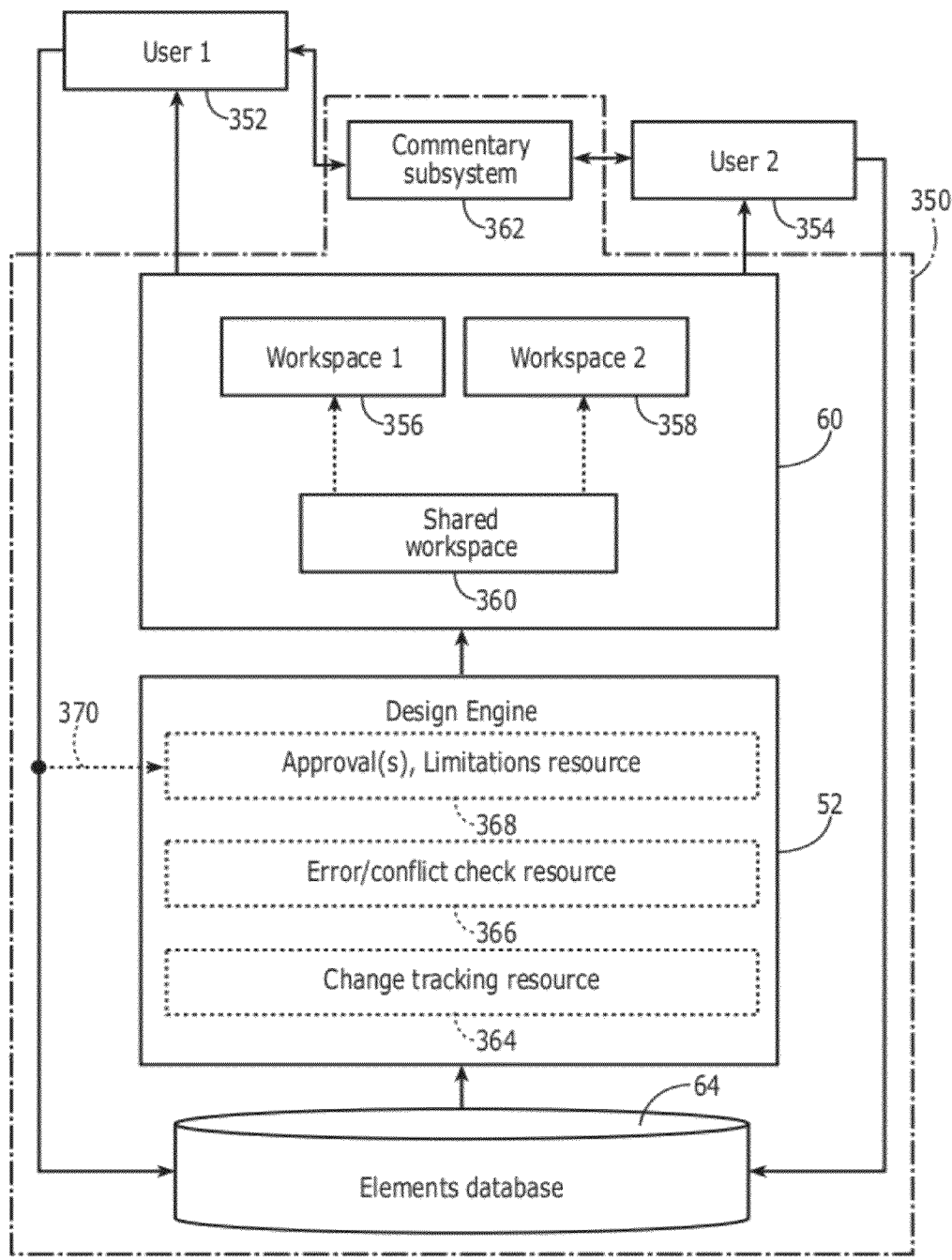
FIG. 5 is an example of a system facilitating collaboration between first and second users according to an embodiment of the present disclosure.

FIG. 5 is an example of a system 350 facilitating collaboration between a first user 352 and a second user 354. While the system of FIG. 5 illustrates two users, it will be readily apparent that this description can be generalized to many more users with equivalent advantages. Each of user 352 and user 354 may access a unique user interface workspace 356, 358, respectively, that provides an independent design workspace for independent design development and manipulation. In addition or as an alternative to individual workspaces, each of users 352, 354 may access a shared workspace 360 in which, for example, manipulations by one user are rendered in a concurrent view, for viewing, editing, and commenting on by the other user. In addition, a commentary system 362, such as a chat system, voice or videoconference system, etc. either within or outside of system 50 may permit interparty communication during the design process.

In addition to tools for manipulating an existing design, new design elements such as cells, systems or components may be accessed by each of users 352, 354 in an elements database 64. Other design tools may be provided as is well know in the art, either by system 50 or by resources external to system 50.

The various manipulations are integrated into a design by design engine 52. Design engine 52 may perform several additional tasks (or alternatively such tasks may be performed by other components of system 50). For example, a change tracking resource 364 for tracking the various manipulations, such as who made each change, when it was made, what elements of the design are affected by the change, may be provided. An error and conflict checking resource 366 for determining whether manipulations made by the various users produce errors or conflicts (such as different concurrent changes to the same element, changes which result in violations of rules or codes, etc.) may also be provided.

In certain embodiments it may be desirable to provide certain parties with approval authority, or limit certain other parties' abilities to manipulate aspects of the design. For example, an architect may wish to permit an interior designer to be able to place furniture and related items in a design, but not modify the design itself. As another example, a chief architect may request that a junior architect propose design manipulations, but before those manipulations are incorporated into the final design the chief architect approves or disapproves such manipulations. It will be appreciated that many opportunities for such approvals and limitations exist in collaboratively developing a design for a structure, and the aforementioned are merely illustrative examples. A resource 368 is provided in order to facilitate such approvals and limitations. Resource 368 may use individual identity, qualifications, certifications, title, association with organizations, passwords, biometric data, or other criteria or security data and processes for determining limitations and granting approvals for user modifications.

In addition, resource 368 may provide certain users, such as user 352, with an interface 370 to resource 368 for approval of manipulations from other users such as user 354. Such approval may be the acceptance (or rejection) of individual manipulations, groups of manipulations, or all manipulations of aspects of said design by said second user 354.

In one embodiment, system 50 is provided with a control that finalizes the design and initiates the process of building a structure, which can be thought of as the ultimate manipulation or a "build it" button. Much responsibility and liability is associated with finalizing the design and initiating the building process (hitting the "build it" button). Accordingly, authority for this level of manipulation may be vested on one or two individuals in the ecosystem, such as the developer, or construction manager. Again, resource 368 may determine if a user has this level of authority.

Furthermore, resource 368 may limit certain manipulations a user may make to a design per se. Such limitations may be based on locking elements of the design in general, or may apply such limits on a user-by-user basis, in which case the aforementioned individual identity, qualifications, certifications, title, association with organizations, or other criteria may be used to determine limitations on user modifications.

Figure 6:
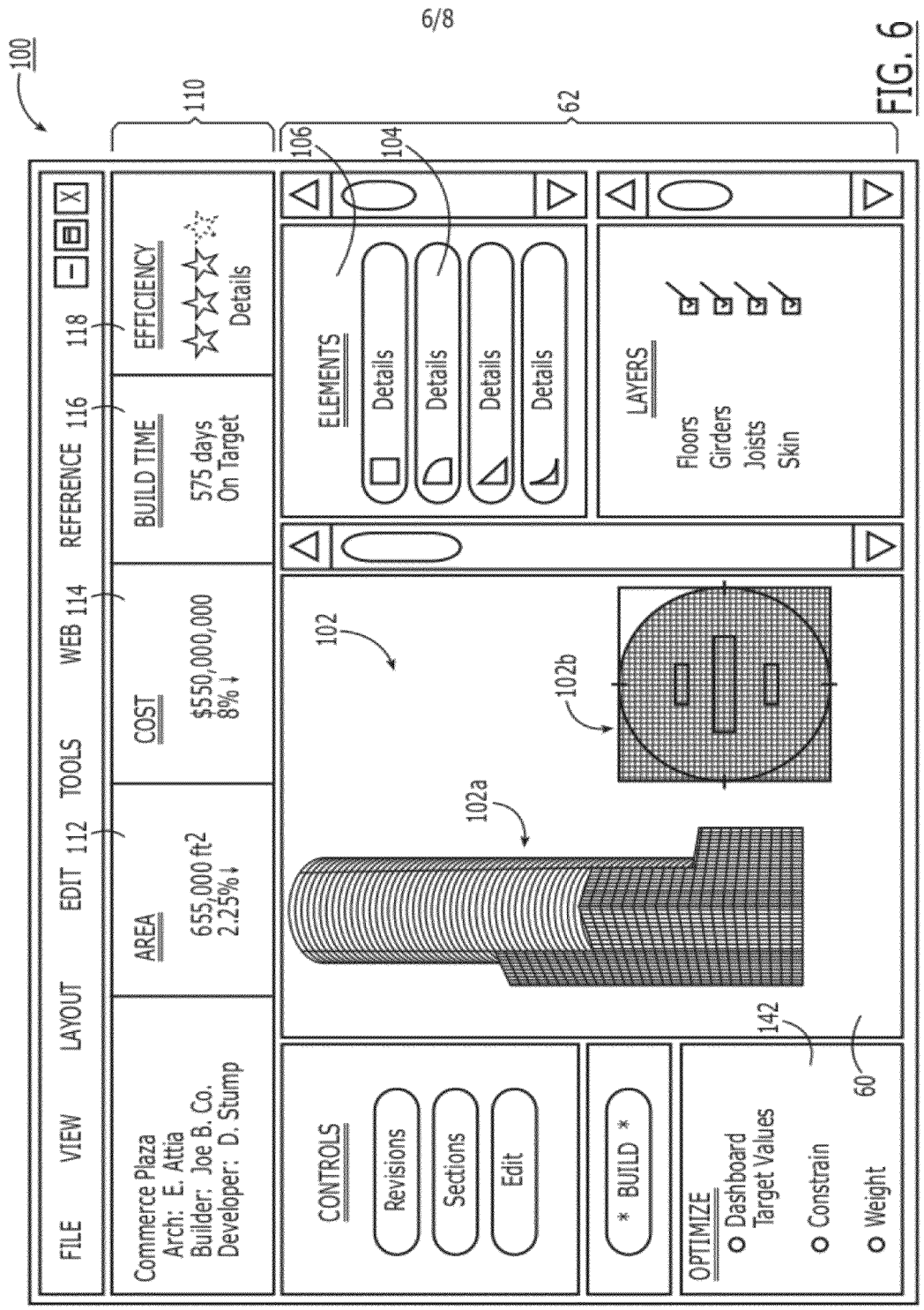
FIG. 6 is an example of a user interface within which a user may view and manipulate a design, view various attributes of the design in a dashboard, and view other aspects of the design and processes according to the present disclosure.

As mentioned, each user 352, 354 may be provided with a user interface for viewing and manipulating a design. FIG. 6 is an example of a graphical user interface (UI) 100 providing a view and tools for manipulating a design 102 (perspective view 102*a* and top view 102*b*, shown) according to an embodiment of the present disclosure. UI 100 comprises, inter alia, a design workspace 60 and various elements of design editing interface 62. It will be appreciated that elements of design editing interface 62 in addition to those illustrated in FIG. 6 may reside in nested levels that become visible and active given certain user selections. Importantly, each user 352, 354 (FIG. 5) may interact with design 102 in their own instance of design workspace 60 through such a UI, or collectively through a shared instance of design workspace 60. In each case, the appearance of interface 100 may be the same.

Many aspect of the design may be manipulated, with design engine 52 revising the design to accommodate those manipulations. These include dragging and dropping new cells, systems or components into the design, deleting cells, systems or components from the design, rearranging cells, systems or components in the design, changing the footprint of the design, etc. In one example, a user may add a structure section or system to design 102 by dragging an appropriate element 104 from an elements palette 106 into design 102. These elements may be cell instances, systems, or components. Many other design manipulation controls may be provided by interface 100, such as for removing portions of a design, reshaping or resizing portions of a design, copying portions of a design, and so on.

UI 100 may provide a display region, referred to as dashboard 110 in which various quantified attributes of the structure may be displayed to provide user feedback. While shown as part of UI 100, dashboard 110 may be provided as a separate UI or part of a different UI forming a part of the system disclosed herein. Dashboard 110 may provide a calculated square footage 112, total cost 114, time-to-completion 116, energy efficiency, 118, and so on. In addition to, or as an alternative to providing these and other attributes for the complete structure, dashboard 110 can provide a user with these attributes and others for selected portions of a structure (not shown). Referring again to FIG. 5, dashboard 110 may be provided to one or both users 352, 354 and in workspaces 356, 358 unique to each, respectively, in a shared workspace 360, or in all three.

With reference again to FIG. 2, an attributes engine 130 receives design data from design engine 52. This includes data about the form, cells, system, and components of the design from cell and structure data database 54 and elements database 64. Attributes engine 130 calculates various attributes of a structure that might be built from the design, and provides those calculated attributes to be displayed in the dashboard 110. In certain embodiments, one or more attributes may be provided from a resource external to the system, such as a database, secondary analysis system, etc.

Details regarding the operation of attributes engine 130 are provided in the aforementioned U.S. patent application Ser. No. 13/112,727.

Figure 7:
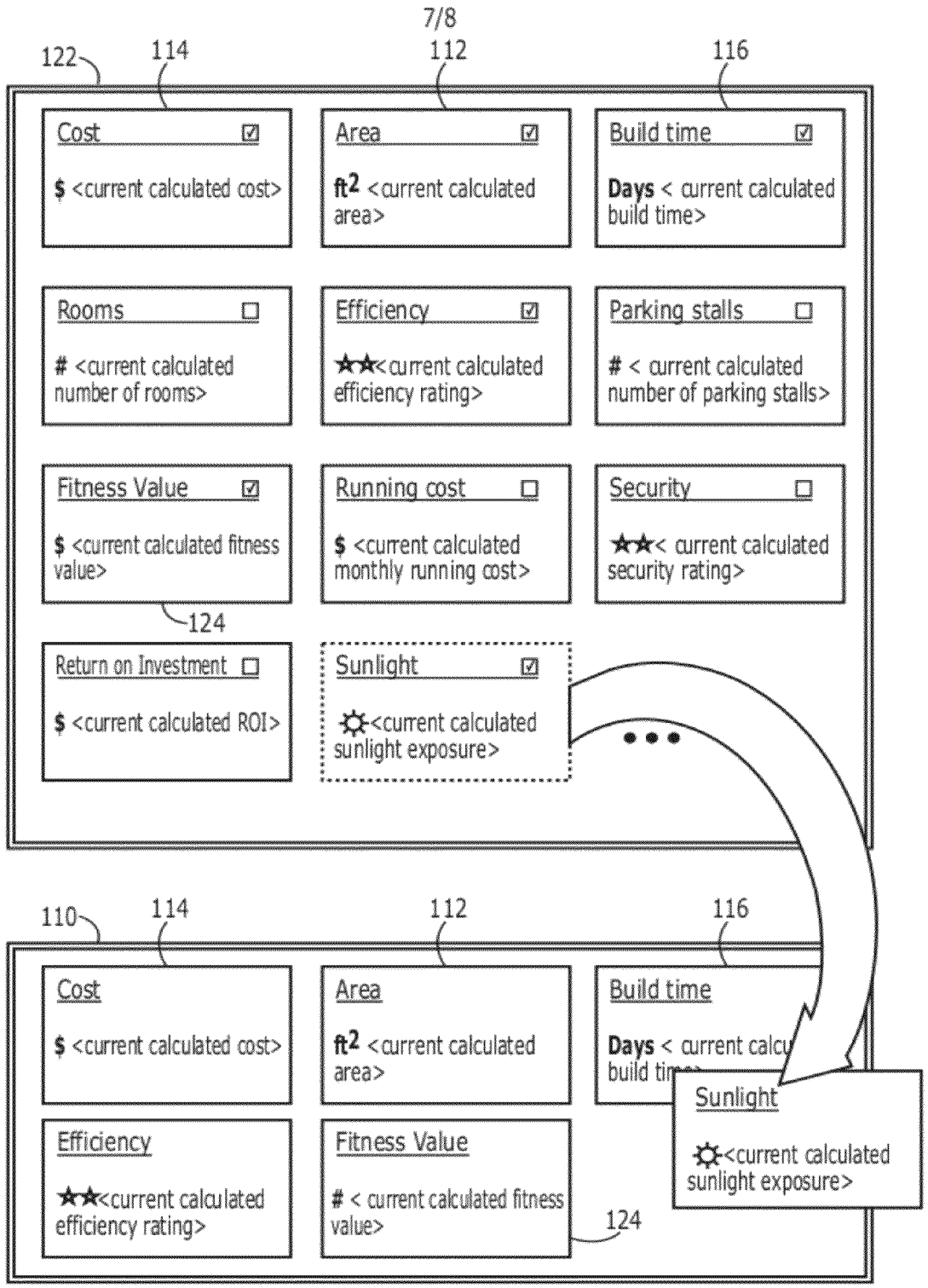
FIG. 7 is an illustration of a user interface for customizing the attributes provided in an instance of a user's dashboard according to an embodiment of the present disclosure.

System 50 may provide each user with a customizable attributes quantification interface, illustrated in FIG. 7, for customizing the attributes provided in their instance of dashboard 110. A user may select one or more user-selectable attribute quantification tools, such as windows 112, 114, 116, etc., from an attributes toolbox window 122, for example by dragging them to their instance of dashboard 110. In this way, a user may customize what set of attributes they view for the design. This permits different users having different roles in a project to focus on attributes most relevant to their role in the project. In one embodiment of the present disclosure, one user is provided with an interface allowing that user to view the attributes selected by another user (and the quantification of those attributes). This individualization of attributes may be tied to other aspects of the present disclosure, such as the approvals and limitations resource 368 (FIG. 5) such that certain users may be precluded from manipulating aspects of a design that change selected attributes of the design. For example, a user may not have the authority to manipulate a design such that the maximum or target square footage of the design changes. Different users may thus be provided with a degree of control over aspects of the design to which their role relates, such as controller having authority for manipulations which result in cost overruns, a construction manager having authority over manipulations which result in changes to the build time, etc.

One such window for design attributes is building fitness function window 124. A structure design has many attributes that may be quantified. Sunlight exposure, energy efficiency, carbon footprint, use of recycled materials, cost per square foot, symmetry of the building, and so on are some examples, and there are many more. It is possible to develop a set of such attributes that represent a quality or "fitness" value for a structure. More specifically, a structure may have a number of such attributes $a_1, a_2, \ldots a_n$. Each attribute may have a weighting $w_1, w_2, \ldots w_n$ that may be applied, respectively, to represent a relative importance of that attribute to the overall fitness of the structure. These weights may be determined based on a user preference, from a population query, derived or interpreted from the behavior of system users, and so forth. It is therefore possible to develop a "Structure Fitness function" (F) for a structure, such that $$F = f(\vec{w}, \vec{a})$$

This is an n-dimensional vector representation. However, there are many other ways to evaluate the fitness function. For example, this function could be quantified as a scalar as $$F = \sum_{x=1}^{x=n} w_x a_x$$

In some applications it may desirable to manipulate the fitness function to obtain a value for analysis and comparison of a structure design. For example, an arithmetic mean fitness function can be represented as $$F_{mean} = \frac{1}{n} \sum_{1}^{n} w_x a_x$$

Many other manipulations of the fitness function are possible, as will be appreciated by one skilled in the art based on the present disclosure.

It will be appreciated that a Structure Fitness function need not be linear in each attribute a. For example, consider the function $$F = \sum w_u w_k (XOR(a_u a_k)) \begin{cases} XOR(a,b) = 1, \text{if } a \neq b \\ XOR(a,b) = 0, \text{if } a = b \end{cases}$$

That is, it is not necessarily true that the function value increases when $a_u$ increases. Furthermore, it will also be appreciated that the Structure Fitness function need not be continuous. For example, consider the function $$F_s = p + F_{s-1} \begin{cases} \text{with } n \in N \\ p = w_k * a_k \text{ if } a_k > n, \\ p = 1 \text{ if } a_k \leq n \end{cases}$$

That is, the value of the function F increases by $w_k * a_k$ if $a_k$ is greater than the positive integer n, but otherwise the value of F increases by 1.

The Structure Fitness function permits a quantitative comparison of different designs, for the same site or for different sites. It also permits users to look for "better" designs (i.e., higher Structure Fitness function) from a library of such designs, such as cell and structure data database 54. Still further, such a Structure Fitness function may be associated with other aspects of the design process described above, such as the approvals and limitations resource 368 (FIG. 5). For example, without proper authority, resource 368 may limit certain users from manipulating a design if such a manipulation lowers the Structure Fitness function.

In general, attributes of a structure will be the same across users (e.g. the square footage of a structure would not change as a function of who is viewing the structure). The ability to change attributes would be a matter of permission within the system. However, according to one embodiment of the present disclosure, any user could be permitted to change a local copy of the weights (i.e., preferences) applied to those attributes in order to investigate changes under different preference scenarios. According to another embodiment, a user may be permitted to "check out" a design and tinker with attributes and weights, but not permitted to check the modified design back in (e.g., the user cannot modify the root design).

With reference once again to FIG. 2, system 50 may be provided with an optimization engine 140, and controls 142 thereover, for optimizing certain portions of the design, for example to meet a design program, to comply with codes and building practices, to meet certain targets for attributes of the design, and so forth. Details regarding the operation of these elements can be found in the aforementioned U.S. patent application Ser. No. 13/112,727. As disclosed therein, a user may enter a target value for an aspect of the design, such as target total structure cost. Entering target values for aspects of the design permits the system to display how the design compares to those target values (such as in dashboard 110, FIG. 6), as well as allowing the system to optimize the design to meet the targets.

According to the present disclosure, each user or some group of users may be provided with an interface in which they may specify their own target values for various attributes for the design. For example, an architect may specify a target calculated sunlight exposure, a construction manager may specify a target build time, and developer may specify a target cost, and so on. One or more users may be provided with a view of the attributes targets specifications of the other users. And this may be tied to approvals and limitations resource 368 (FIG. 5) such that certain parties may specify only certain attribute targets, certain target specifications have a higher weight in the optimization process, and so on.

Returning to FIG. 2, design engine 52 is provided with an interface for communicating with a secondary analysis system 170. Examples of such secondary analysis systems include structural analysis software, environmental simulation software, other design systems, project management systems, supply chain management systems, document production systems, permitting and approval system, and so on. In one embodiment, the communication with secondary analysis system 170 is purely by way of an exchange of data, without user intervention. In such a case, the interface may provide the data in a format in which design engine 52 produces said data (i.e., a native format). Alternatively, the interface may be required to provide the data in a format different that a native format (i.e., a destination format appropriate for the secondary analysis system). In this case, the interface may convert the data into the destination format.

However, in another embodiment, human interaction is required to facilitate the external analysis performed by secondary analysis system 170 (i.e., system is broad enough in this instance to include a person or groups of people). For example, certain portions of the design may require various comments and approvals, such as a planning commission approval, environmental commission analysis, and so forth. The interface for communicating with a secondary analysis system 170 can therefore be tailored to meet the specific requirements of the parties, and further facilitate receipt of feedback from the secondary analysis system 170. In this way, collaboration with the parties associated with a secondary analysis system 170 is facilitated by system 50.

Figure 8:
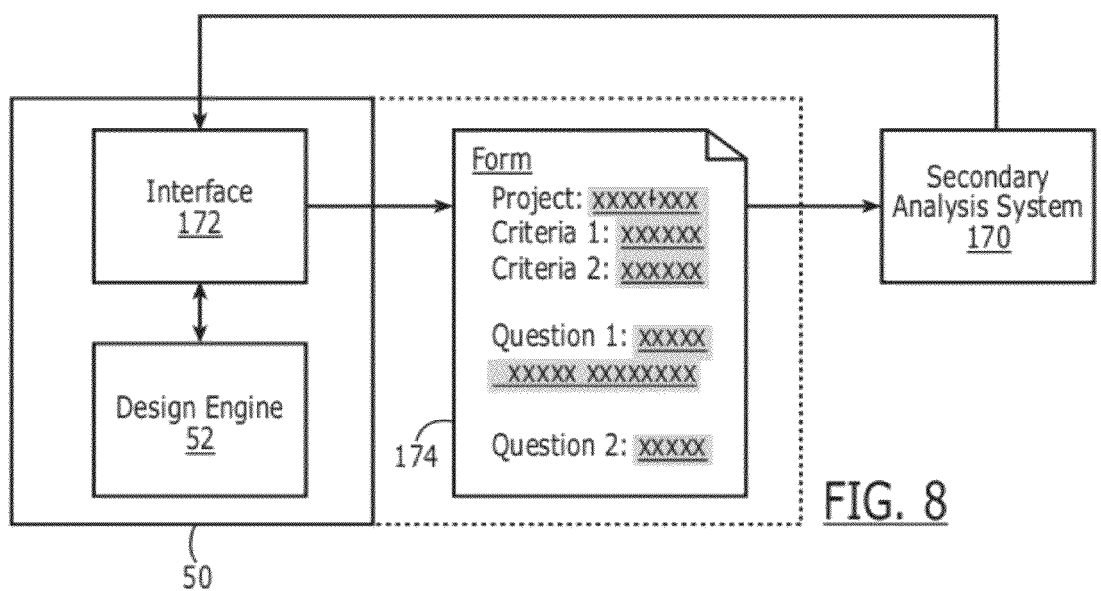
FIG. 8 is an example of an interface that formats data, including optionally populating a form with such data, for delivery to a secondary analysis system, and for receiving analysis data therefrom, according to an embodiment of the present disclosure.

With reference to FIG. 8, many secondary analysis systems require that data be provided in a specific format and/or embedded in a specific form. An interface 172 to secondary analysis system 170 can draw relevant design data, in native format, from design engine 52, and convert that data into an appropriate destination format. In addition, or as an alternative approach, interface 172 can format the data for population of an appropriate form template 174, automatically populate such a form, and submit the form directly to secondary analysis system 170. The data/forms may be considered by the secondary analysis system 170 (again, which may comprise an individual or group of individuals as well as a more autonomous computer-based system), and their feedback provided via interface 172 to system 50. System 50 can digest the feedback, and if needed make appropriate design modifications, or alert an appropriate user that modifications may be required in response to the feedback from secondary analysis system 170.

Referring again to FIG. 2, upon completion of the design, obtaining of permits and approvals, verification of costs, availability, and so forth of the specified systems, components, and services, export engine 200 can provide the design or relevant portions thereof to the specified vendors and service providers, and request confirmation of the commitments made. The system can also provide the final design details to the developer so that the developer can confirm that the design meets the developer's preferences, to facilitate the developer obtaining funding, to request final approval to proceed, and so on. The system may thereafter track changes to the design, cost and delivery changes, and other aspects of implementing the design, and provide a build dashboard, not shown, which can provide an estimate of attributes of the build phase such as cost, time-to-completion, and so on. In sum, the system and methods of the present disclosure permit an improved degree of communication and coordination among the varied participants in the creation of a structure design and implementation of that design as compared to known systems and methods.

While a plurality of preferred exemplary embodiments have been presented in the foregoing detailed description, it should be understood that a vast number of variations exist, and these preferred exemplary embodiments are merely representative examples, and are not intended to limit the scope, applicability or configuration of the disclosure in any way. Various of the above-disclosed and other features and functions, or alternative thereof, may be desirably combined into many other different systems or applications. Various presently unforeseen or unanticipated alternatives, modifications variations, or improvements therein or thereon may be subsequently made by those skilled in the art which are also intended to be encompassed by the claims, below.

Therefore, the foregoing description provides those of ordinary skill in the art with a convenient guide for implementation of the disclosure, and contemplates that various changes in the functions and arrangements of the described embodiments may be made without departing from the spirit and scope of the disclosure defined by the claims thereto.

What is claimed is:

1. A computer-implemented system for facilitating collaborative structure design efforts, and for coordinating implementation of a resulting design, comprising:
    a design workspace in which a structure design is capable of being rendered during a design process;
    a design engine which receives various inputs, and produces a structure design for display in said design workspace;
    a first interface, coupled to said design engine, permitting a first user to view and manipulate aspects of said design rendered in said design workspace;
    a second interface, coupled to said design engine, permitting a second user to view and manipulate aspects of said design rendered in said design workspace;
    a library of design elements and editing tools, coupled to said first and second interfaces and said design engine such that said first user, said second user or both said first and second users may select an element therefrom and place said element in said design, or otherwise edit said design, for rendering by said design engine in said design workspace;
    an attributes engine which quantifies measures of various attributes of a structure based on said structure design during the process of designing said structure and updates quantification of said measures when manipulation of aspects of said design result in modification of said design;
    a dashboard coupled to said attributes engine for displaying said measures of various attributes of said structure, said dashboard viewable by said first user and said second user;
    a first customizable attributes quantification interface associated with said first user;
    a second customizable attributes quantification interface associated with said second user;
    each of said first and second customizable attributes quantification interfaces permitting said first and second users, respectively, to specify values for selected structure attributes, said specified values forming an input to said design engine;
    an attributes toolbox which presents to said first user and said second user a plurality of user-selectable attributes quantification tools;
    such that based upon selection of an attributes quantification tool by either said first user, said second user or both said first user and said second user, said selected tool is added to said first customizable attributes quantification interface, said second customizable attributes quantification interface, or both said first and second customizable attributes quantification interfaces, respectively;
    each of said first and second customizable attributes quantification interfaces further comprising a direction mechanism permitting said corresponding first or second user, respectively, to direct said system to weight optimization of one attribute greater than other attributes; and
    wherein said first customizable attributes quantification interface is provided with a mechanism permitting viewing of said second user's direction to said system to weight optimization of one attribute greater than other attributes.

2. A computer-implemented method of facilitating collaborative structure design efforts, and for coordinating implementation of a resulting design, comprising:
    providing a design workspace in which a structure design is capable of being rendered during a design process;
    providing a design engine which receives various inputs, and produces a structure design for display in said design workspace;
    providing a first interface, coupled to said design engine, permitting a first user to view and manipulate aspects of said design rendered in said design workspace;
    providing a second interface, coupled to said design engine, permitting a second user to view and manipulate aspects of said design rendered in said design workspace;
    providing a library of design elements and editing tools, coupled to said first and second interfaces and said design engine such that said first user, said second user or both said first and second users may select an element therefrom and place said element in said design, or otherwise edits said design, for rendering by said design engine in said design workspace;
    providing an attributes engine which quantifies measures of various attributes of a structure based on said structure design during the process of designing said structure and updates quantification of said measures when manipulation of aspects of said design result in modification of said design;
    providing a dashboard coupled to said attributes engine for displaying said measures of various attributes of said structure, said dashboard viewable by said first user and said second user;
    providing a first customizable attributes quantification interface associated with said first user;
    providing a second customizable attributes quantification interface associated with said second user;
    each of said first and second customizable attributes quantification interfaces permitting said first and second users, respectively, to specify values for selected structure attributes, said specified values forming an input to said design engine;
    providing an attributes toolbox which presents to said first user and said second user a plurality of user-selectable attributes quantification tools;

such that based upon selection of an attributes quantification tool by either said first user, said second user or both said first user and said second user, said selected tool is added to said first customizable attributes quantification interface, said second customizable attributes quantification interface, or both said first and second customizable attributes quantification interfaces, respectively;

providing, for each of said first and second customizable attributes quantification interfaces, a direction mechanism permitting said corresponding first or second user, respectively, to direct said system to weight optimization of one attribute greater than other attributes; and wherein said first customizable attributes quantification interface is provided with a mechanism permitting viewing of said second user's direction to said system to weight optimization of one attribute greater than other attributes.

* * * * *